United States Patent [19]

Pruett

[11] Patent Number: 4,949,542
[45] Date of Patent: Aug. 21, 1990

[54] TRIPLEX PISTON SYSTEM FOR HYDRAULIC BRAKES

[76] Inventor: Lloyd L. Pruett, 1210 Whitney Dr., Columbia, Tenn. 38401

[21] Appl. No.: 434,223

[22] Filed: Nov. 13, 1989

[51] Int. Cl.⁵ ............................................. B60T 7/02
[52] U.S. Cl. ...................................... 60/594; 60/652; 60/583; 60/593
[58] Field of Search ................. 60/551, 555, 562, 565, 60/579, 583, 593, 594

[56] References Cited

U.S. PATENT DOCUMENTS

| | | | |
|---|---|---|---|
| 3,146,597 | 9/1964 | Knauss | 60/594 X |
| 3,739,579 | 6/1973 | Lutz | 60/594 |
| 4,212,167 | 7/1980 | Pruett | 60/550 X |

*Primary Examiner*—Allen M. Ostrager
*Attorney, Agent, or Firm*—Abe Hatcher

[57] ABSTRACT

In a brake system having an auxiliary, booster or slave cylinder, the addition of a middle chamber between the forward and rear chambers of the master cylinder to increase the unit pressure (psi) and insure sufficient fluid volume to prevent failure of the system.

4 Claims, 1 Drawing Sheet

U.S. Patent
Aug. 21, 1990
4,949,542
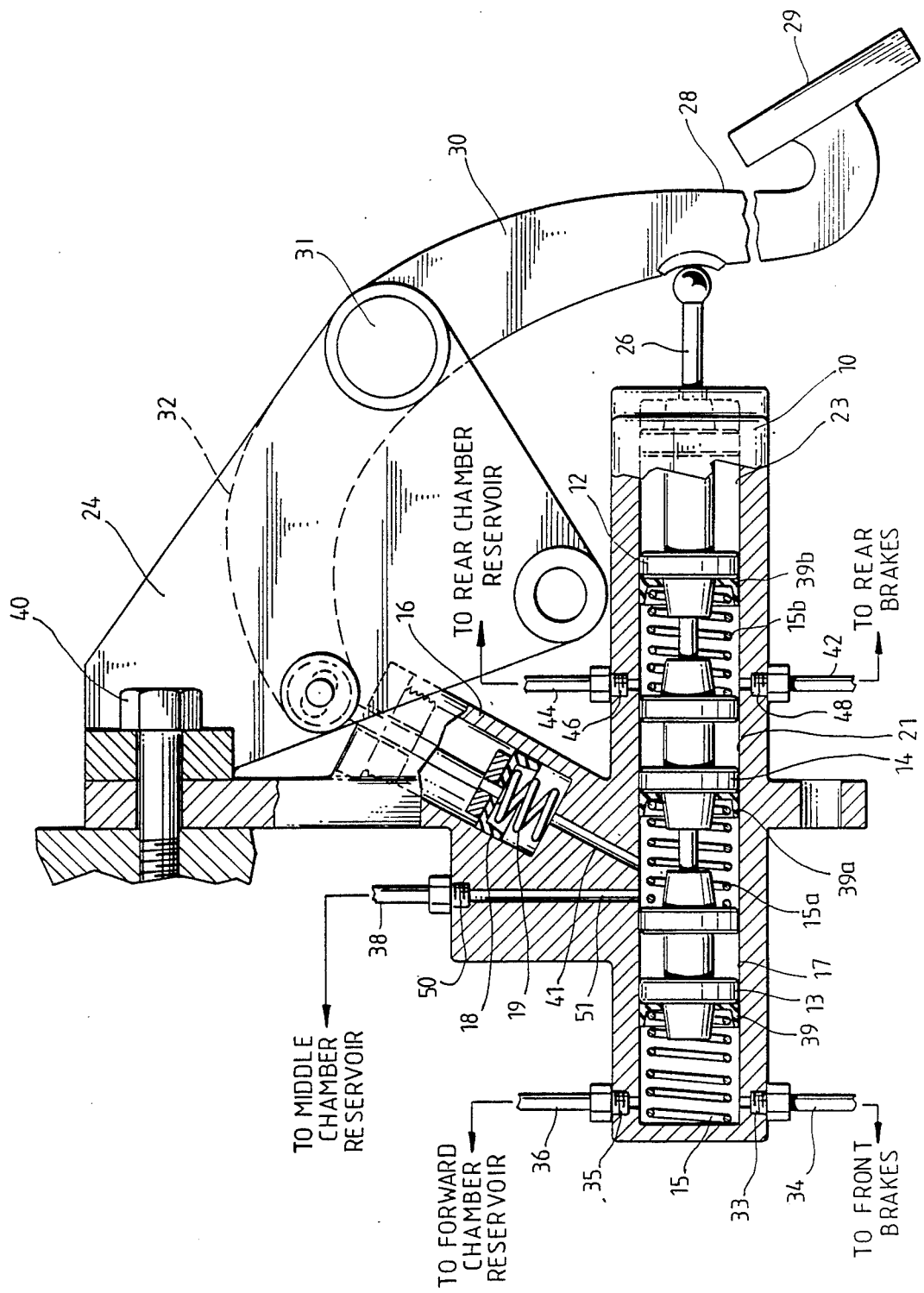

TRIPLEX PISTON SYSTEM FOR HYDRAULIC BRAKES

BACKGROUND OF THE INVENTION

1. Field of the Invention

This invention relates to brake cylinders. More particularly, it relates to a new master cylinder structure of an auxiliary cylinder braking apparatus.

2. Description of the Prior Art

My U.S. Pat. No. 4,212,167 involves an hydraulic brake force recycling system which employs a brake pedal to which force is applied to generate pressure ahead of a master cylinder piston for pressurizing the piston of an auxiliary, booster or slave cylinder and a brake lever pivotally mounted on a fixed pivot, movable in two directions from a rest position, connected to a piston rod of the auxiliary cylinder on one side of the fixed pivot and in abutment connection with a piston rod of the master cylinder on the other side of the fixed pivot. In this system pressure generated by the master cylinder piston upon pivoting of the brake lever in one direction is transmitted to the auxiliary piston to cause pivoting of the brake lever in the same direction so that the initial force applied to the pedal is amplified. This apparatus of U.S. Pat. No. 4,212,167 has had only limited success in commercial use because of both lack of sufficient fluid volume to constantly serve both the auxiliary, booster or slave cylinder and the master or primary cylinder and the fact that when the booster cylinder failed, the primary tended to go out also, and vice versa.

SUMMARY OF THE INVENTION

After extended investigation I have found that these potential defects can be remedied by hydraulically isolating the auxiliary, booster or slave cylinder pressure chamber from the master cylinder primary or rear pressure chamber and the master cylinder secondary, front or forward pressure chamber. This is done by creating a separate pressure chamber between the front and rear pressure chambers of the master cylinder so that the fluid volumes are separated and the booster or slave cylinder is not dependent upon a single pressure source. This structure also enables the piston of each of the three pressure chambers of the master cylinder to have its own individual pressure chamber and its own individual port adapted to lead, when space is not available in the immediate vicinity, to a separate reservoir for itself elsewhere in the particular vehicle in which it is used. Thus, isolating the booster cylinder also makes it possible to reduce the size of the master cylinder, automatically increasing the psi (for same force applied to a smaller area). Providing a third or middle chamber for the master cylinder further makes it possible to increase the size of the slave cylinder, thereby substantially increasing the output of the brake mechanism.

BRIEF DESCRIPTION OF THE DRAWING

Referring now to the drawing, the sole figure thereof, partly in perspective, partly in section and partly semi-schematic, depicts an improved representative hydraulic brake system according to the invention, including the new third or middle chamber of a master cylinder located between a forward or front and a rear chamber of the master cylinder, the master cylinder being positioned generally in intermediate cyclical location between an auxiliary or booster cylinder and a pedal-brake lever portion of the hydraulic brake system, with an individual port and reservoir line for each chamber of the master cylinder.

DETAILED DESCRIPTION OF THE DRAWING AND THE PREFERRED EMBODIMENTS

In the drawing, piston 12 is actuated by a pedal 29 via push rod 26, with the resulting hydraulic pressure generated being applied via a connecting line or passageway 41 from master cylinder 10 to a piston of piston-cup arrangement 18 in auxiliary, booster or slave cylinder 16 containing spring 19 and to which is connected brake lever 28, pivotted at 31 and having a lower portion 30 and an upper portion 32. A bracket and a mounting screw are represented respectively by 24 and 40.

The master cylinder 10 is divided into respective forward, middle and rear portions or sections 17, 21 and 23, each comprising a chamber, the respective front, middle and rear chambers having respective return springs; annular cups; ports; and reservoir lines 15, 15a and 15b; 39, 39a and 39b; 35, 50 and 46; and 36, 38 and 44, with line 51 leading from the middle chamber of middle section 21 to said port 50. Lines 34 and 42 lead respectively from ports 33 and 48 toward respective front and rear brakes. The front and middle chambers of the master cylinder 10 have respective pistons 13 and 14. Auxiliary cylinder 16 includes a return spring mechanism 19.

While the invention has been described in terms of preferred embodiments, the claims appended hereto are intended to encompass all embodiments which fall within the spirit of the invention.

Having thus described my invention and certain preferred embodiments thereof, I claim:

1. Hydraulic brake apparatus comprising in cyclical cooperative juxtaposition a brake pedal connected to a master cylinder by a push rod, said master cylinder being divided into a rear chamber, a middle chamber and a forward chamber, each having a piston member therein, an auxiliary booster cylinder having a piston member therein, an hydraulic fluid line leading from said master cylinder to said auxiliary booster cylinder, and a brake lever movable in two directions from a fixed pivot, said brake lever being connected to a piston rod of said auxiliary booster cylinder on one side of said fixed pivot and being in abutment connection with a piston rod of said rear chamber of said master cylinder on the other side of said fixed pivot.

2. The hydraulic brake apparatus of claim 1 wherein said rear chamber, said middle chamber and said front chamber each has its own port adapted to lead to its own reservoir.

3. In an hydraulic brake apparatus comprising a brake pedal connected to a master cylinder having front and rear chambers with a piston in each, an auxiliary booster cylinder having its own piston, an hydraulic fluid line leading from said master cylinder to said auxiliary booster cylinder and a brake lever movable in two directions from a rest position, connected to a piston rod of said auxiliary booster piston on one side of a fixed pivot and being in abutment connection with a piston rod of said piston of said rear chamber of said master cylinder on the other side of said fixed pivot, the improvement comprising a middle chamber with a piston positioned in said master cylinder between said front chamber and said rear chamber, said middle chamber providing an hydraulic pressure source when said master cylinder or said auxiliary booster cylinder fails.

4. The improvement of claim 3 wherein each chamber has its own port adapted to lead to its own reservoir.

* * * * *